United States Patent
Jitkoff et al.

(10) Patent No.: US 9,639,244 B2
(45) Date of Patent: May 2, 2017

(54) SYSTEMS AND METHODS FOR HANDLING STACKABLE WORKSPACES

(71) Applicant: Google Inc., Mountain View, CA (US)

(72) Inventors: John Nicholas Jitkoff, Palo Alto, CA (US); Alexander Friedrich Kuscher, San Francisco, CA (US); Scott Ronald Violet, Sunnyvale, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/708,869

(22) Filed: Dec. 7, 2012

(65) Prior Publication Data

US 2014/0075373 A1   Mar. 13, 2014

Related U.S. Application Data

(60) Provisional application No. 61/698,515, filed on Sep. 7, 2012.

(51) Int. Cl.
*G06F 3/0484* (2013.01)
*G06F 3/0481* (2013.01)
(Continued)

(52) U.S. Cl.
CPC .......... *G06F 3/0484* (2013.01); *G06F 3/017* (2013.01); *G06F 3/0481* (2013.01);
(Continued)

(58) Field of Classification Search
CPC ...... G06F 3/0488; G06F 3/0486; G06F 3/017; G06F 3/0484; G06F 3/04815;
(Continued)

(56) References Cited

U.S. PATENT DOCUMENTS 5,140,678 A   8/1992  Torres
5,564,002 A * 10/1996  Brown .......................... 715/778
(Continued)

FOREIGN PATENT DOCUMENTS

| EP | 536579 A2 | 4/1993 |
|---|---|---|
| JP | 2010-134738 A | 6/2010 |
| JP | 2011-022811 A | 2/2011 |
| WO | WO-2011/007401 A1 | 1/2011 |

OTHER PUBLICATIONS

"Grazing Browser—Features," retrieved from <http://grazingbrowser.com/features.php>, Oct. 5, 2011.
(Continued)

*Primary Examiner* — Nicholas Ulrich
(74) *Attorney, Agent, or Firm* — McDermott Will & Emery LLP

(57) ABSTRACT

Systems and methods for navigating stackable workspaces on an electronic device are provided. A system includes a navigation module configured to display a first workspace of a plurality of workspaces stacked along a stacking axis. The plurality of workspaces includes a second workspace stacked on the first workspace. At least one application is open in the first workspace or in the second workspace. The system also includes a detection module configured to detect at least one of a first inter-workspace swipe gesture and an intra-workspace swipe gesture. The navigation module is configured to display the second workspace in response to the first inter-workspace swipe gesture. The navigation module is configured to switch between features or applications of the at least one application in response to the intra-workspace swipe gesture.

22 Claims, 10 Drawing Sheets

(51) Int. Cl.
  *G06F 3/0485* (2013.01)
  *G06F 3/0482* (2013.01)
  *G06F 3/0483* (2013.01)
  *G06F 3/0488* (2013.01)
  *G06F 3/01* (2006.01)

(52) U.S. Cl.
  CPC .......... *G06F 3/0482* (2013.01); *G06F 3/0483* (2013.01); *G06F 3/0485* (2013.01); *G06F 3/04815* (2013.01); *G06F 3/04883* (2013.01); *G06F 2203/04808* (2013.01)

(58) Field of Classification Search
  CPC .... G06F 3/0485; G06F 3/0482; G06F 3/0481; G06F 3/0483; G06F 3/04883; G06F 2203/04808
  USPC ....... 715/778, 769, 863, 779, 781, 783, 764, 715/810, 788, 799
  See application file for complete search history.

(56) References Cited

U.S. PATENT DOCUMENTS

| | | | |
|---|---|---|---|
| 6,239,798 | B1 | 5/2001 | Ludolph et al. |
| 6,628,309 | B1* | 9/2003 | Dodson et al. ............... 715/769 |
| 6,727,892 | B1 | 4/2004 | Murphy |
| 6,862,712 | B1* | 3/2005 | Nakagawa et al. ........... 715/707 |
| 7,543,234 | B2 | 6/2009 | Daniels et al. |
| 7,594,185 | B2* | 9/2009 | Anderson et al. ............ 715/778 |
| 7,681,143 | B2 | 3/2010 | Lindsay et al. |
| 7,735,018 | B2 | 6/2010 | Bakhash |
| 7,797,641 | B2 | 9/2010 | Karukka et al. |
| 7,904,826 | B2 | 3/2011 | Vronay et al. |
| 7,954,064 | B2* | 5/2011 | Forstall et al. ............... 715/779 |
| 8,046,712 | B2 | 10/2011 | Landman et al. |
| 8,166,415 | B2 | 4/2012 | Cisler et al. |
| 8,214,768 | B2 | 7/2012 | Boule et al. |
| 8,239,785 | B2 | 8/2012 | Hinckley et al. |
| 8,543,935 | B2* | 9/2013 | Duffy ............................ 715/778 |
| 8,578,290 | B2* | 11/2013 | Amadio et al. ............... 715/778 |
| 8,605,034 | B1 | 12/2013 | Roy |
| 8,638,292 | B2 | 1/2014 | Kawakami et al. |
| 9,507,588 | B2 | 11/2016 | Arriola et al. |
| 2003/0189597 | A1* | 10/2003 | Anderson et al. ............ 345/778 |
| 2005/0125739 | A1* | 6/2005 | Thompson et al. .......... 715/778 |
| 2005/0188329 | A1 | 8/2005 | Cutler et al. |
| 2005/0273466 | A1 | 12/2005 | Yoon |
| 2006/0026535 | A1 | 2/2006 | Hotelling et al. |
| 2006/0036962 | A1 | 2/2006 | Jobs et al. |
| 2006/0161861 | A1 | 7/2006 | Holecek et al. |
| 2006/0224991 | A1 | 10/2006 | Stabb et al. |
| 2007/0038955 | A1 | 2/2007 | Nguyen |
| 2008/0034314 | A1* | 2/2008 | Louch et al. ................. 715/778 |
| 2008/0040692 | A1 | 2/2008 | Sunday et al. |
| 2008/0165152 | A1 | 7/2008 | Forstall et al. |
| 2008/0168401 | A1* | 7/2008 | Boule et al. .................. 715/863 |
| 2008/0195961 | A1* | 8/2008 | Bae et al. ..................... 715/769 |
| 2008/0297483 | A1 | 12/2008 | Kim et al. |
| 2008/0320419 | A1 | 12/2008 | Matas et al. |
| 2009/0077501 | A1 | 3/2009 | Partridge et al. |
| 2009/0178007 | A1 | 7/2009 | Matas et al. |
| 2009/0204925 | A1* | 8/2009 | Bhat et al. .................... 715/778 |
| 2009/0228820 | A1* | 9/2009 | Kim et al. ..................... 715/769 |
| 2009/0237367 | A1 | 9/2009 | Ryu et al. |
| 2009/0237372 | A1 | 9/2009 | Kim et al. |
| 2009/0265628 | A1* | 10/2009 | Bamford et al. ............. 715/702 |
| 2009/0267909 | A1 | 10/2009 | Chen et al. |
| 2009/0322692 | A1 | 12/2009 | Kim et al. |
| 2010/0020035 | A1 | 1/2010 | Ryu et al. |
| 2010/0031185 | A1 | 2/2010 | Wilson et al. |
| 2010/0039400 | A1 | 2/2010 | Jang |
| 2010/0044121 | A1 | 2/2010 | Simon et al. |
| 2010/0107046 | A1 | 4/2010 | Kang et al. |
| 2010/0125817 | A1 | 5/2010 | Kang et al. |
| 2010/0211872 | A1 | 8/2010 | Rolston et al. |
| 2010/0222112 | A1 | 9/2010 | Han |
| 2010/0251154 | A1* | 9/2010 | Chang et al. ................. 715/769 |
| 2010/0298034 | A1 | 11/2010 | Shin et al. |
| 2010/0313126 | A1 | 12/2010 | Jung et al. |
| 2010/0317503 | A1 | 12/2010 | Subramanian et al. |
| 2011/0004821 | A1 | 1/2011 | Miyazawa et al. |
| 2011/0037720 | A1* | 2/2011 | Hirukawa et al. ............ 345/173 |
| 2011/0039603 | A1 | 2/2011 | Kim et al. |
| 2011/0047459 | A1* | 2/2011 | Van Der Westhuizen .... 715/702 |
| 2011/0050591 | A1 | 3/2011 | Kim et al. |
| 2011/0050594 | A1 | 3/2011 | Kim et al. |
| 2011/0050602 | A1 | 3/2011 | Jeong et al. |
| 2011/0061021 | A1 | 3/2011 | Kang et al. |
| 2011/0078624 | A1 | 3/2011 | Missig et al. |
| 2011/0083098 | A1 | 4/2011 | Cisler et al. |
| 2011/0083105 | A1 | 4/2011 | Shin et al. |
| 2011/0087982 | A1 | 4/2011 | McCann et al. |
| 2011/0128241 | A1 | 6/2011 | Kang et al. |
| 2011/0167350 | A1 | 7/2011 | Hoellwarth |
| 2011/0179368 | A1 | 7/2011 | King et al. |
| 2011/0179386 | A1 | 7/2011 | Shaffer et al. |
| 2011/0184738 | A1 | 7/2011 | Kalisky et al. |
| 2011/0208712 | A1 | 8/2011 | Jones et al. |
| 2011/0209057 | A1 | 8/2011 | Hinckley et al. |
| 2011/0209104 | A1 | 8/2011 | Hinckley et al. |
| 2011/0210932 | A1 | 9/2011 | Ryu et al. |
| 2011/0252357 | A1 | 10/2011 | Chaudhri |
| 2011/0256848 | A1 | 10/2011 | Bok et al. |
| 2011/0260829 | A1 | 10/2011 | Lee |
| 2011/0265002 | A1 | 10/2011 | Hong et al. |
| 2011/0265036 | A1 | 10/2011 | Hoehne |
| 2011/0296333 | A1 | 12/2011 | Bateman et al. |
| 2011/0296334 | A1 | 12/2011 | Ryu et al. |
| 2011/0296351 | A1 | 12/2011 | Ewing, Jr. et al. |
| 2011/0307778 | A1 | 12/2011 | Tsai et al. |
| 2012/0007854 | A1 | 1/2012 | Cho |
| 2012/0026118 | A1 | 2/2012 | Hackborn |
| 2012/0030625 | A1 | 2/2012 | Miyazaki |
| 2012/0054663 | A1 | 3/2012 | Baek et al. |
| 2012/0081399 | A1 | 4/2012 | Sirpal et al. |
| 2012/0083260 | A1 | 4/2012 | Arriola et al. |
| 2012/0084647 | A1 | 4/2012 | Homma et al. |
| 2012/0089938 | A1 | 4/2012 | Homma et al. |
| 2012/0096395 | A1 | 4/2012 | Ording et al. |
| 2012/0102425 | A1 | 4/2012 | Song |
| 2012/0124505 | A1 | 5/2012 | St. Jacques, Jr. |
| 2012/0127109 | A1 | 5/2012 | Nishio et al. |
| 2012/0130764 | A1 | 5/2012 | Harthcryde et al. |
| 2012/0131496 | A1 | 5/2012 | Goossens et al. |
| 2012/0166975 | A1 | 6/2012 | Oh et al. |
| 2012/0167017 | A1 | 6/2012 | Oh |
| 2012/0174042 | A1 | 7/2012 | Chang |
| 2012/0210270 | A1 | 8/2012 | Kwon et al. |
| 2012/0242584 | A1 | 9/2012 | Tuli |
| 2012/0246596 | A1* | 9/2012 | Ording et al. ................ 715/799 |
| 2012/0297335 | A1 | 11/2012 | Ramasubramanian et al. |
| 2012/0311438 | A1 | 12/2012 | Cranfill et al. |
| 2013/0047125 | A1 | 2/2013 | Kangas et al. |
| 2013/0095464 | A1 | 4/2013 | Ediger et al. |
| 2013/0097556 | A1* | 4/2013 | Louch ........................... 715/790 |
| 2013/0111395 | A1 | 5/2013 | Ying et al. |
| 2013/0117698 | A1 | 5/2013 | Park et al. |
| 2013/0132906 | A1* | 5/2013 | Siurumaa et al. ............ 715/835 |
| 2013/0201113 | A1* | 8/2013 | Hinckley et al. ............. 345/173 |
| 2013/0232409 | A1 | 9/2013 | Cranfill et al. |
| 2013/0239063 | A1 | 9/2013 | Ubillos et al. |
| 2013/0298069 | A1 | 11/2013 | Petschnigg et al. |
| 2014/0123081 | A1 | 5/2014 | Park et al. |
| 2014/0165006 | A1 | 6/2014 | Chaudhri et al. |
| 2014/0229911 | A1 | 8/2014 | Inamoto |
| 2015/0026630 | A1 | 1/2015 | Bullock |

OTHER PUBLICATIONS

"Life Web Browser V 1.5," It's About Time, retrieved from <http://itabouttimeproducts.com.Its_About_Time/Life.html>, Oct. 5, 2011.

(56) References Cited

OTHER PUBLICATIONS

"Multi-Touch Gestures," From the Wikipedia, the free encyclopedia, Aug. 30, 2011, <http://en.wikipedia.org/wiki/Multi-touch_gestures>.

"Quick Start Guide," retrieved from <http://perfectbrowser.com/quickstart_ipad.html>, Oct. 5, 2011.

Anonymous, iPod touch Benutzerhandbuch (with iPhone 2.1 Software), Sep. 9, 2008, retrieved from http://manuals.info.apple.com/de_DE/iPod_touch_2.1_Benutzerhandbuch.pdf.

Jam House Inc., "Hitome-de-wakaru Windows 7, Home edition," (Windows 7 at a glance, Home edition, Nikkei Business Publications, Inc., Oct. 26, 2009, 1$^{st}$ edition, p. 6 and 28.

Bamboo User's Guide, Wacom Co., Ltd., 2011, Version 1.0, Rev. G1511, p. 24.

Tatsuro Hokugo, "Three-dimensino, Animation, Clarity makes an operatino of an equipment gorgeous," Nikkei Electronics, Nikkei Business Publications, Inc., Mar. 26, 2007, vol. 948, p. 61-69.

Japanese Office Action mailed Jan. 10, 2017, which issued in Japanese Application No. 2015-531072.

\* cited by examiner

SYSTEMS AND METHODS FOR HANDLING STACKABLE WORKSPACES

CROSS-REFERENCES TO RELATED APPLICATIONS

The present application claims the benefit of U.S. Provisional Patent Application Ser. No. 61/698,515, entitled "Stackable Workspaces on an Electronic Device," filed on Sep. 7, 2012, which is hereby incorporated by reference in its entirety for all purposes.

FIELD

The subject technology generally relates to user interfaces and, in particular, relates to systems and methods for handling stackable workspaces on an electronic device.

BACKGROUND

An operating system of an electronic device typically allows a user to open many applications at the same time. However, if the screen of the electronic device is too small and/or if too many applications are open at the same time, the screen of the electronic device may not be able to display all the applications. Furthermore, the operating system may not necessarily organize the different applications in an intuitive manner, thereby rendering it difficult for the user to keep track of and/or select a particular application to use.

SUMMARY

According to various aspects of the subject technology, a system for providing stackable workspaces on an electronic device is provided. The system comprises a navigation module configured to display a first workspace of a plurality of workspaces stacked along a stacking axis. The navigation module is configured to display a navigation menu when the first workspace is displayed. The navigation menu comprises a set of access points. Each access point is associated with an application. The system also comprises a workspace module configured to open at least one of the plurality of applications in a second workspace of the stack of workspaces. The second workspace is stacked on the first workspace. The system also comprises a detection module configured to detect a second workspace scrolling command. The navigation module is configured to display the second workspace in response to the second workspace scrolling command. Displaying the second workspace comprises traversing the stack from the first workspace to the second workspace along the stacking axis. The navigation module is configured to display the navigation menu when the second workspace is displayed.

According to various aspects of the subject technology, a computer-implemented method for providing stackable workspaces on an electronic device is provided. The method comprises displaying a first workspace of a plurality of workspaces stacked along a stacking axis. The method also comprises displaying a navigation menu when the first workspace is displayed. The navigation menu comprises a set of access points. Each access point is associated with an application. The method also comprises opening at least one of the plurality of applications in a second workspace of the stack of workspaces. The second workspace is stacked on the first workspace. The method also comprises detecting a second workspace scrolling command and displaying the second workspace in response to the second workspace scrolling command. Displaying the second workspace comprises traversing the stack from the first workspace to the second workspace along the stacking axis. The method also comprises displaying the navigation menu when the second workspace is displayed.

According to various aspects of the subject technology, a machine-readable medium encoded with executable instructions for a method of providing stackable workspaces on an electronic device is provided. The method comprises displaying a first workspace of a plurality of workspaces stacked along a stacking axis. The method also comprises displaying a navigation menu when the first workspace is displayed. The navigation menu comprises a set of access points. Each access point is associated with an application. The method also comprises opening at least one of the plurality of applications in a second workspace of the stack of workspaces. The second workspace is stacked on the first workspace. The method also comprises detecting a second workspace scrolling command and displaying the second workspace in response to the second workspace scrolling command. Displaying the second workspace comprises traversing the stack from the first workspace to the second workspace along the stacking axis. The method also comprises displaying the navigation menu when the second workspace is displayed.

According to various aspects of the subject technology, a system for providing a user interface on an electronic device is provided. The system comprises a workspace module configured to generate a first workspace. The system also comprises a navigation module configured to generate a navigation menu comprising a set of access points. Each access point is associated with an application. The system also comprises a detection module configured to detect a swipe gesture performed on a first access point of the set of access points. The workspace module is configured to open the application associated with the first access point in a first window at an end of the swipe gesture in the first workspace. A size of the first window is less than a maximized size of the first workspace. The maximized size of the first workspace is substantially equal to a size of a screen of the electronic device.

According to various aspects of the subject technology, a computer-implemented method for providing a user interface on an electronic device is provided. The method comprises generating a first workspace and generating a navigation menu comprising a set of access points. Each access point is associated with an application. The method also comprises detecting a swipe gesture performed on a first access point of the set of access points. The method also comprises opening the application associated with the first access point in a first window at an end of the swipe gesture in the first workspace. A size of the first window is less than a maximized size of the first workspace. The maximized size of the first workspace is substantially equal to a size of a screen of the electronic device.

According to various aspects of the subject technology, a machine-readable medium encoded with executable instructions for a method of providing a user interface on an electronic device is provided. The method comprises generating a first workspace and generating a navigation menu comprising a set of access points. Each access point is associated with an application. The method also comprises detecting a swipe gesture performed on a first access point of the set of access points. The method also comprises opening the application associated with the first access point in a first window at an end of the swipe gesture in the first workspace. A size of the first window is less than a maximized size of the first workspace. The maximized size of the first workspace is substantially equal to a size of a screen of the electronic device.

According to various aspects of the subject technology, a system for navigating stackable workspaces on an electronic device is provided. The system comprises a navigation module configured to display a first workspace of a plurality of workspaces stacked along a stacking axis. The plurality of workspaces comprises a second workspace stacked on the first workspace. At least one application is open in the first workspace or in the second workspace. The system also comprises a detection module configured to detect at least one of a first inter-workspace swipe gesture and an intra-workspace swipe gesture. The navigation module is configured to display the second workspace in response to the first inter-workspace swipe gesture. The navigation module is configured to switch between features or applications of the at least one application in response to the intra-workspace swipe gesture.

According to various aspects of the subject technology, a computer-implemented method for navigating stackable workspaces on an electronic device is provided. The method comprises displaying a first workspace of a plurality of workspaces stacked along a stacking axis. The plurality of workspaces comprises a second workspace stacked on the first workspace. At least one application is open in the first workspace or in the second workspace. The method also comprises detecting at least one of a first inter-workspace swipe gesture and an intra-workspace swipe gesture. The method also comprises displaying the second workspace in response to the first inter-workspace swipe gesture. The method also comprises switching between features or applications of the at least one application in response to the intra-workspace swipe gesture.

According to various aspects of the subject technology, a machine-readable medium encoded with executable instructions for a method of navigating stackable workspaces on an electronic device is provided. The method comprises displaying a first workspace of a plurality of workspaces stacked along a stacking axis. The plurality of workspaces comprises a second workspace stacked on the first workspace. At least one application is open in the first workspace or in the second workspace. The method also comprises detecting at least one of a first inter-workspace swipe gesture and an intra-workspace swipe gesture. The method also comprises displaying the second workspace in response to the first inter-workspace swipe gesture. The method also comprises switching between features or applications of the at least one application in response to the intra-workspace swipe gesture.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

According to various aspects of the subject technology, an intuitive user interface for organizing and displaying different workspaces on an electronic device is provided. A workspace comprises an area in which one or more applications can be displayed to a user of the electronic device. A workspace may allow the user to view and/or interact with one or more applications opened in that workspace. According to various aspects of the subject technology, a plurality of workspaces may be stacked on top of one another so that the user may be able to easily keep track of and/or use an application opened in a particular workspace.

Figure 1:
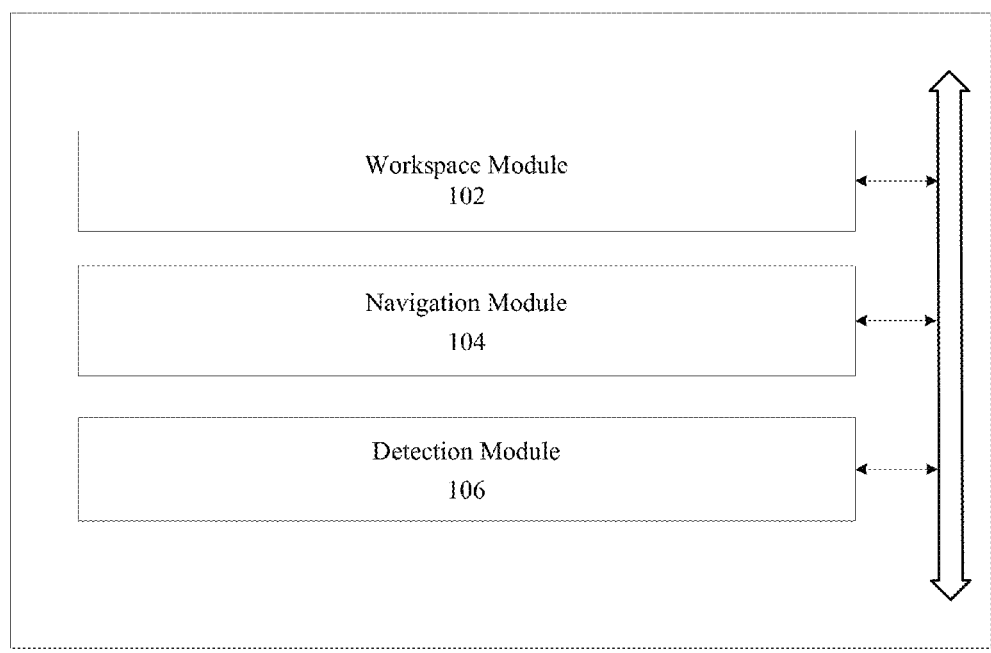
FIG. 1 illustrates an example of a system for providing stackable workspaces on an electronic device, in accordance with various aspects of the subject technology.

FIG. 1 illustrates an example of system 100 for providing stackable workspaces on an electronic device, in accordance with various aspects of the subject technology. System 100 comprises workspace module 102, navigation module 104, and detection module 106. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure. System 100, for example, may be part of the electronic device. The electronic device may be a desktop computer, a laptop computer, a netbook computer, a tablet, a mobile phone, a personal digital assistant, and/or other suitable device.

Figure 2:
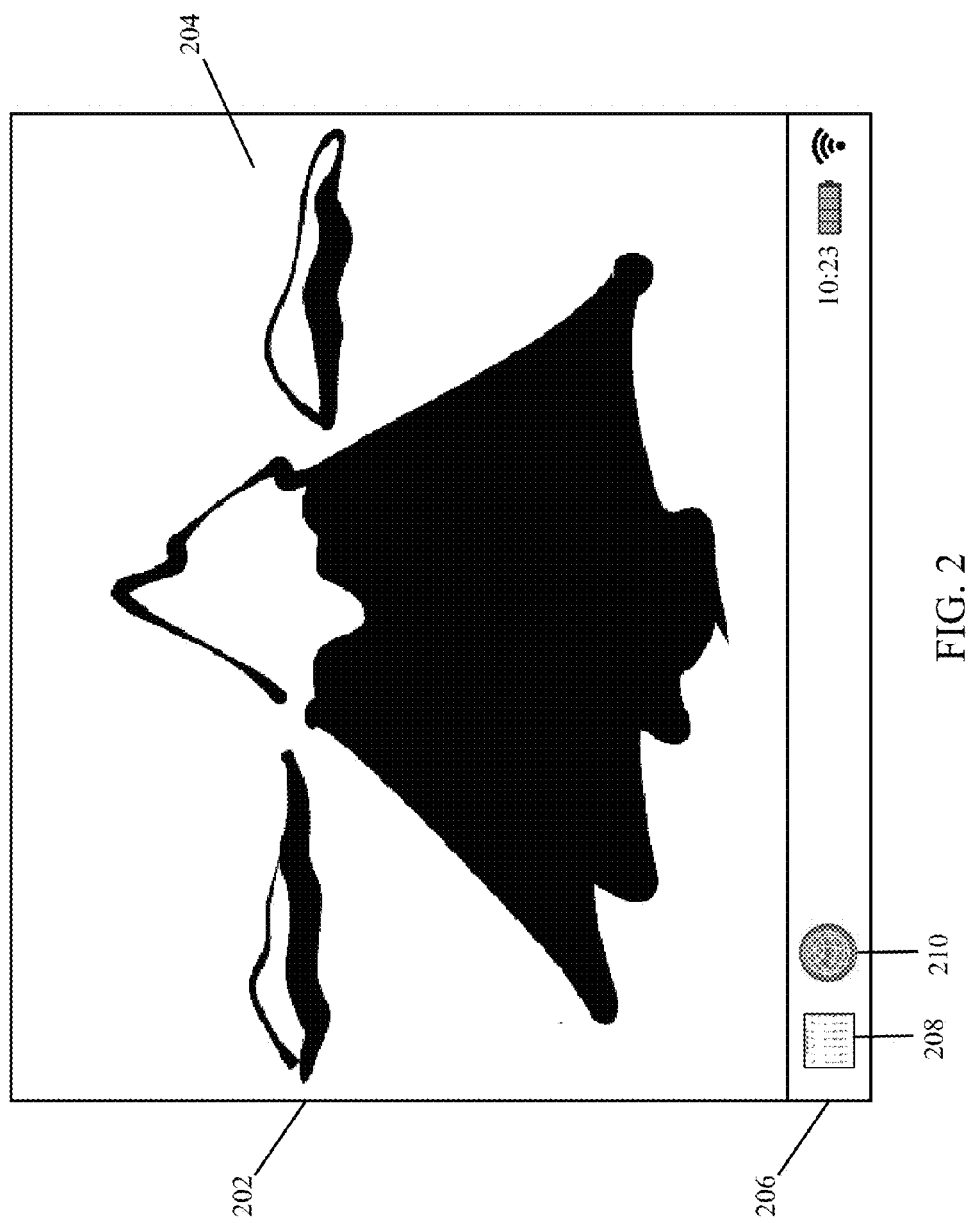
FIG. 2 illustrates an example of a desktop workspace displayed on a screen of the electronic device, in accordance with various aspects of the subject technology.

FIG. 2 illustrates an example of desktop workspace 202 displayed on a screen of the electronic device, in accordance with various aspects of the subject technology. When an operating system of the electronic device boots up, for example, navigation module 104 may display desktop workspace 202 to a user of the electronic device first. As shown, desktop workspace 202 comprises desktop wallpaper 204. Navigation module 104 also displays navigation menu 206, which comprises access points 208 and 210 (e.g., icons, links, shortcuts, bookmarks, etc.). Access point 208, for example, is a shortcut that provides access to a calendar application. Access point 210, for example, is a shortcut that provides access to a web browser application. These applications can be opened in different ways using access points 208 and 210, either in desktop workspace 202 or in new workspaces stacked on desktop workspace 202. Although only the calendar application and the web browser application are described, the subject technology is applicable to other applications such as productivity applications and multimedia applications.

Figure 3:
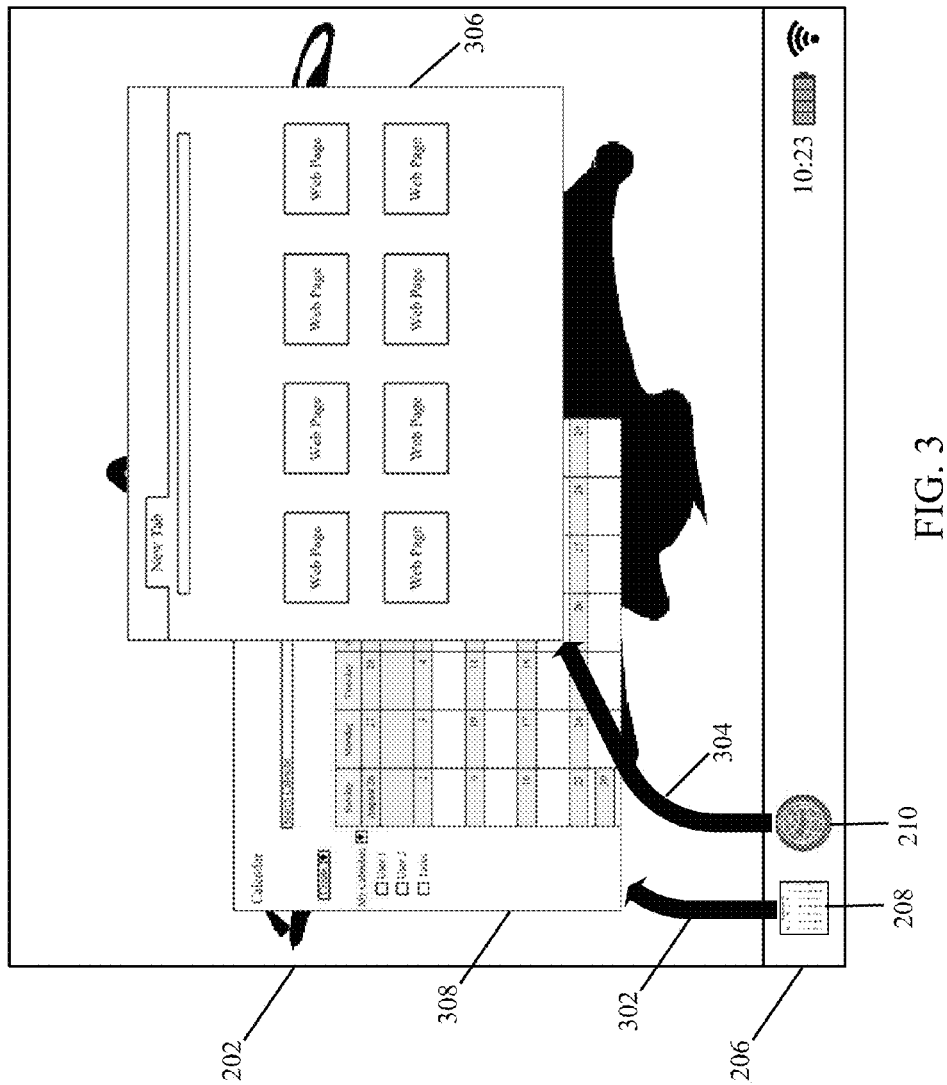
FIG. 3 illustrates an example of opening a calendar application and a web browser application in a desktop workspace using access points, in accordance with various aspects of the subject technology.

FIG. 3 illustrates an example of opening the calendar application and the web browser application in desktop workspace 202 using access points 208 and 210, in accordance with various aspects of the subject technology. According to certain aspects, the user may perform a swipe gesture on access point 208 (e.g., along path 302) and a swipe gesture on access point 210 (e.g., along path 304) to open the respective applications. Detection module 106 may detect these swipe gestures, and in response to such a detection, workspace module 102 may open the respective applications at the respective ends of the swipe gestures. For example, as shown in FIG. 3, the calendar application is opened in window 308, while the web browser application is opened in window 306. These windows are displayed within desktop workspace 202, and have sizes that are less than a maximized size of desktop workspace 202. The maximized size of a workspace, such as desktop workspace 202, may be substantially equal to a size of the screen of the electronic device. In some aspects, this maximized size may be at least 95%, 90%, or 80% of the size of the screen of the electronic device. Still, in other aspects, this maximized size may be a lower percentage of the size of the screen of the electronic device depending on whether other objects (e.g., navigation menu 206) are displayed at the same time.

Figure 4:
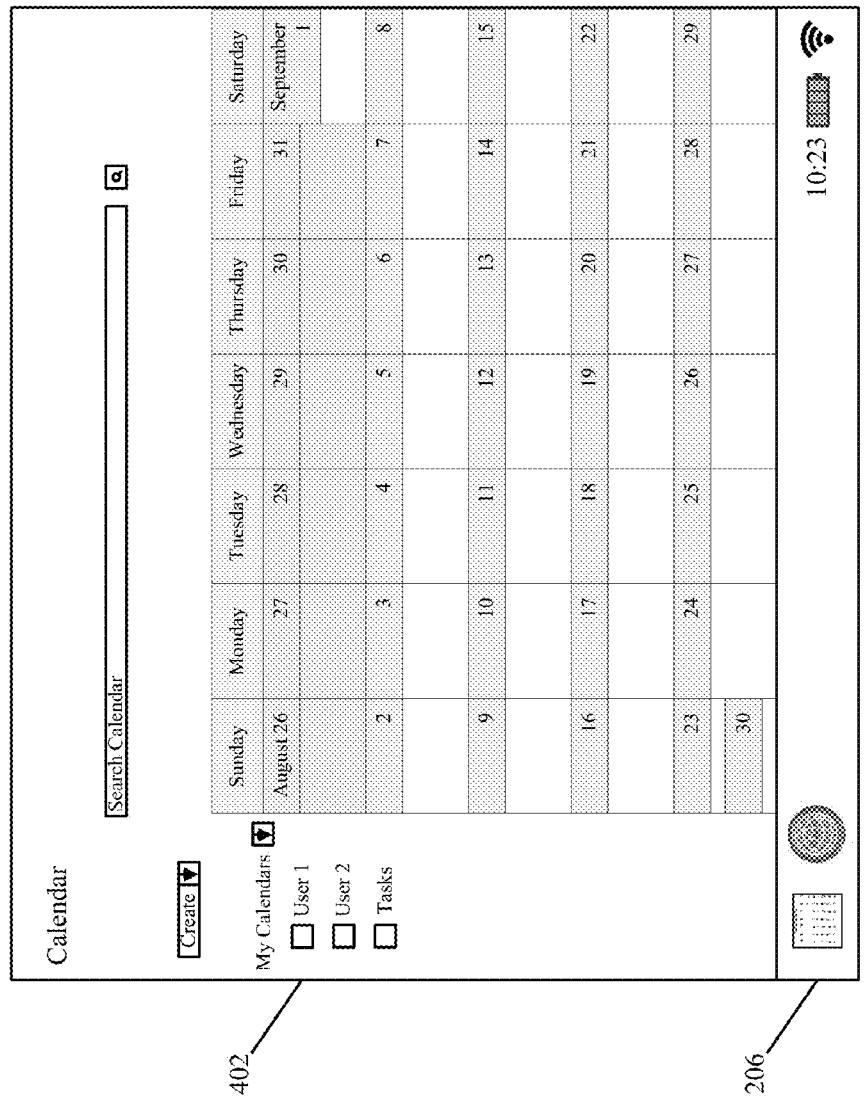
FIG. 4 illustrates an example of a workspace in which a calendar application is opened, in accordance with various aspects of the subject technology.
Figure 5:
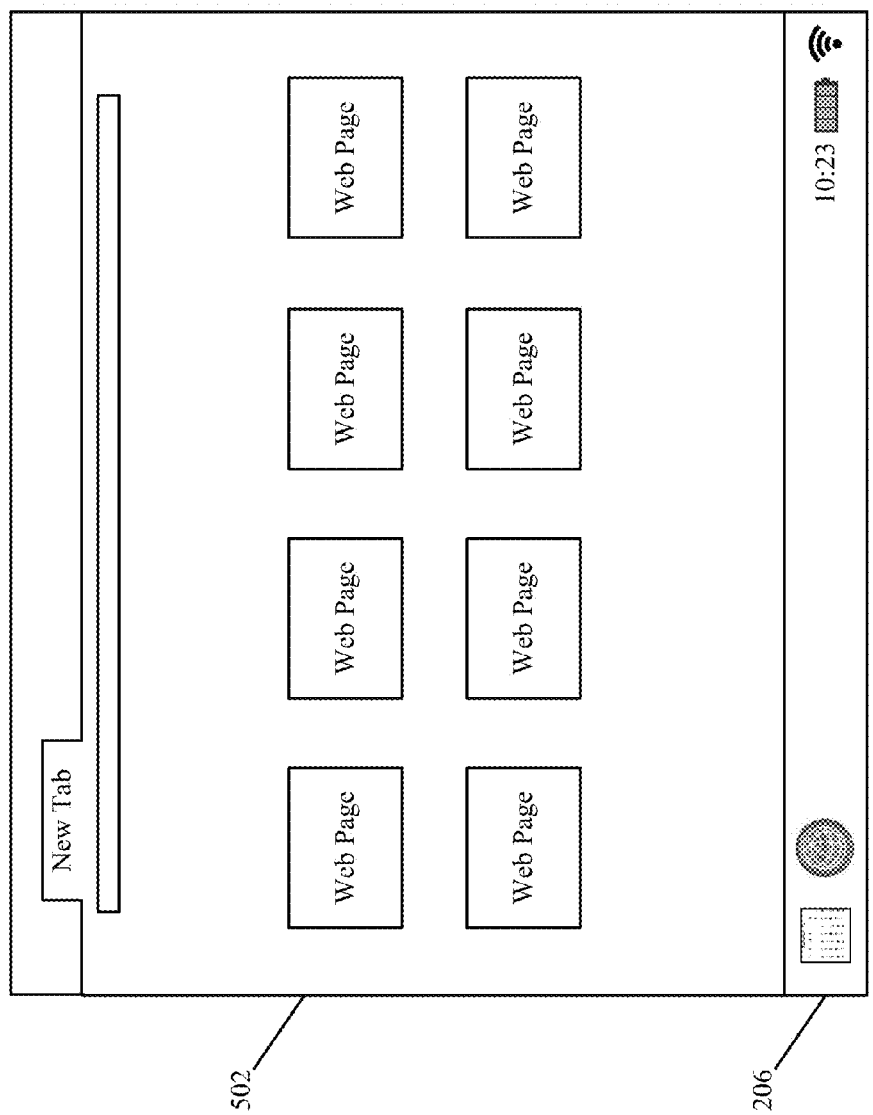
FIG. 5 illustrates an example of a workspace in which a web browser application is opened, in accordance with various aspects of the subject technology.

While the calendar application and the web browser application are displayed in FIG. 3 in sizes that are less than a maximized size of desktop workspace 202, these applications may also be opened in different workspaces such that each application may be maximized in a respective workspace. FIG. 4 illustrates an example of calendar workspace 402 in which the calendar application is opened, in accordance with various aspects of the subject technology. FIG. 5 illustrates an example of web browser workspace 502 in which the web browser application is opened, in accordance with various aspects of the subject technology. As shown in these figures, each application is maximized in its respective workspace. According to certain aspects, the applications can be maximized in this manner in several different ways. For example, referring back to FIG. 3, the user may be allowed to select an option to maximize either window 308 or window 306. Doing so will allow the respective application to be opened in a new workspace. As another example, the user may perform a tap gesture on access points 208 and 210, which may automatically open and/or maximize the respective application in a new workspace. The user may also be allowed to open a contextual menu with respect to access points 208 and 210 (e.g., by right clicking on these access points) in order to reveal an option to open and/or maximize the respective application in a new workspace.

Figure 6:
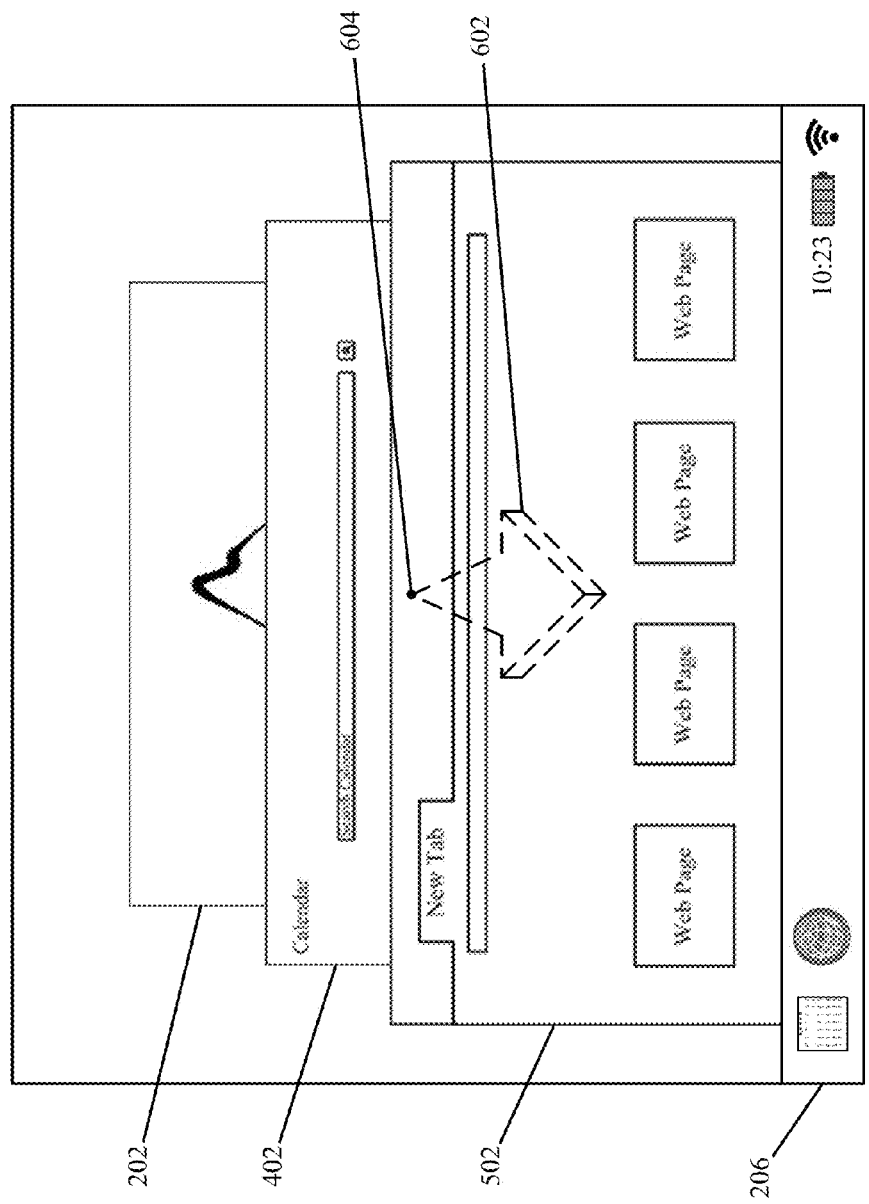
FIG. 6 illustrates an example of an overview of workspaces stacked on top of one another along a stacking axis, in accordance with various aspects of the subject technology.

According to various aspects of the subject technology, workspace module 102 may generate workspaces and open applications in the workspaces. As discussed above, these workspaces may be stacked on top of one another in order to allow the user to easily navigate between different workspaces. FIG. 6 illustrates an example of an overview of workspaces 202, 402, and 502 stacked on top of one another along stacking axis 602, in accordance with various aspects of the subject technology. Stacking axis 602 is shown as an arrow proceeding in a direction out of the page from vanishing point 604. Stacking axis 602 is illustrated using dotted lines to indicate that it is not a part of the content of workspaces 202, 402, and 502. As shown in FIG. 6, web browser workspace 502 is stacked on calendar workspace 402, which is stacked on desktop workspace 202. Stacking workspaces in this manner may allow the user to visualize where the workspaces are relative to one another, thereby allowing the user to easily navigate between workspaces.

For example, suppose the user is currently viewing desktop workspace 202 (e.g., FIG. 2) and wishes to navigate to calendar workspace 402 (e.g., FIG. 4). This transition from desktop workspace 202 to calendar workspace 402 may be displayed as an animation, thereby making it easy for the user to visualize the positions of the workspaces relative to one another. According to certain aspects, navigation module 104 may display this animation as a traversal of the stack of workspaces from desktop workspace 202 to calendar workspace 402. Navigation module 104, for example, may display this traversal according to two approaches.

According to a first approach, navigation module 104 may display the traversal of the stack in a manner that focuses on the maximized sizes of the workspaces during the traversal. For example, navigation module 104 may shrink desktop workspace 202 from its maximized size (e.g., as shown in FIG. 2) to an overview size, which is less than the maximized size of desktop workspace 202. Shrinking desktop workspace 202 in this manner may give the user the appearance that desktop workspace 202 is moving away from the user. Navigation module 104 may also fade in calendar workspace 402 during the shrinking of desktop workspace 202. Furthermore, navigation module 104 may shrink calendar workspace 402 from a supermaximized size to its maximized size (e.g., as shown in FIG. 4) during the fading in of calendar workspace 402. The supermaximized size of calendar workspace 402 is greater than the maximized size of calendar workspace 402 (e.g., greater than a size of the screen of the electronic device). Shrinking and fading in calendar workspace 402 in this manner may give the user the appearance that calendar workspace 402 is moving from behind the user to directly in front of the user.

Figure 7:
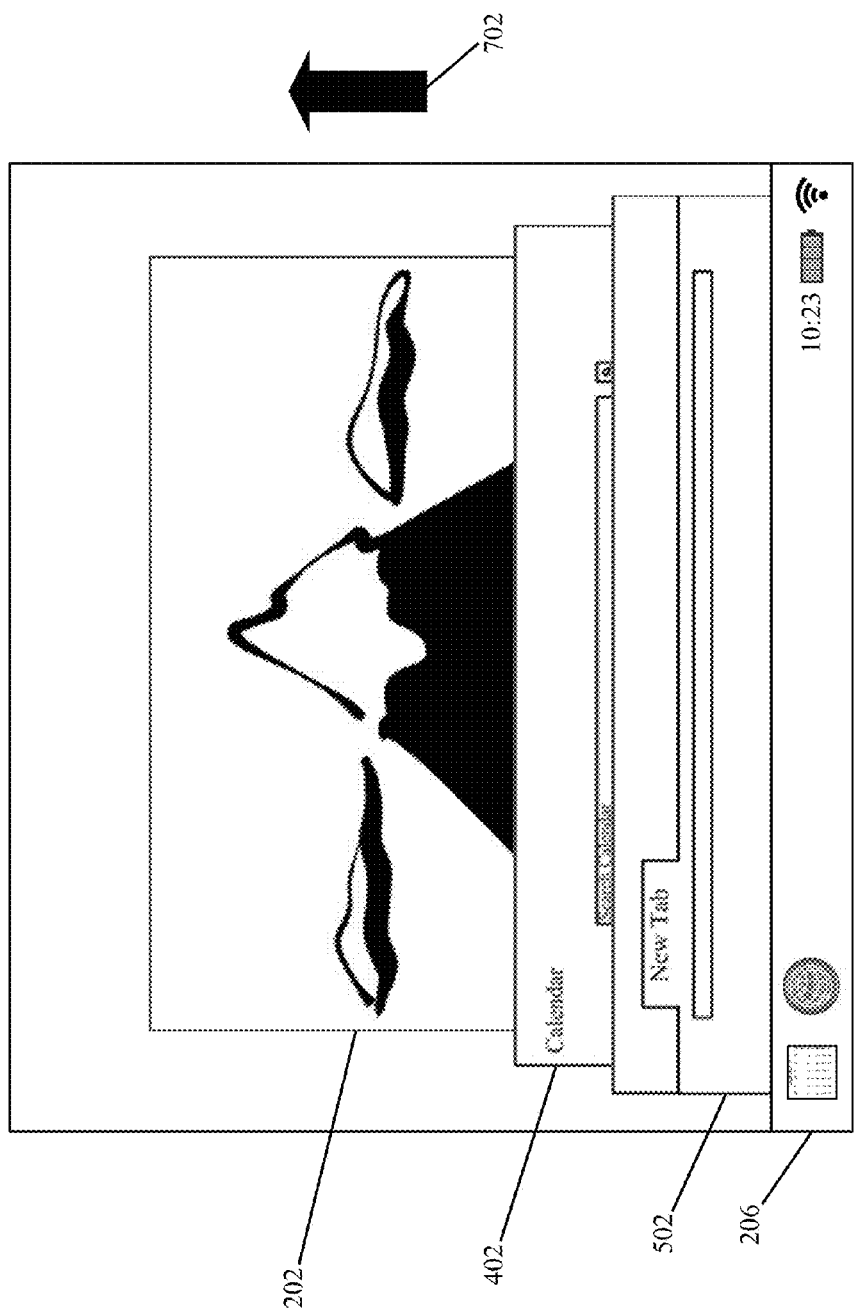
FIG. 7 illustrates an example of an overview of workspaces stacked on top of one another along a stacking axis, in accordance with various aspects of the subject technology.
Figure 8:
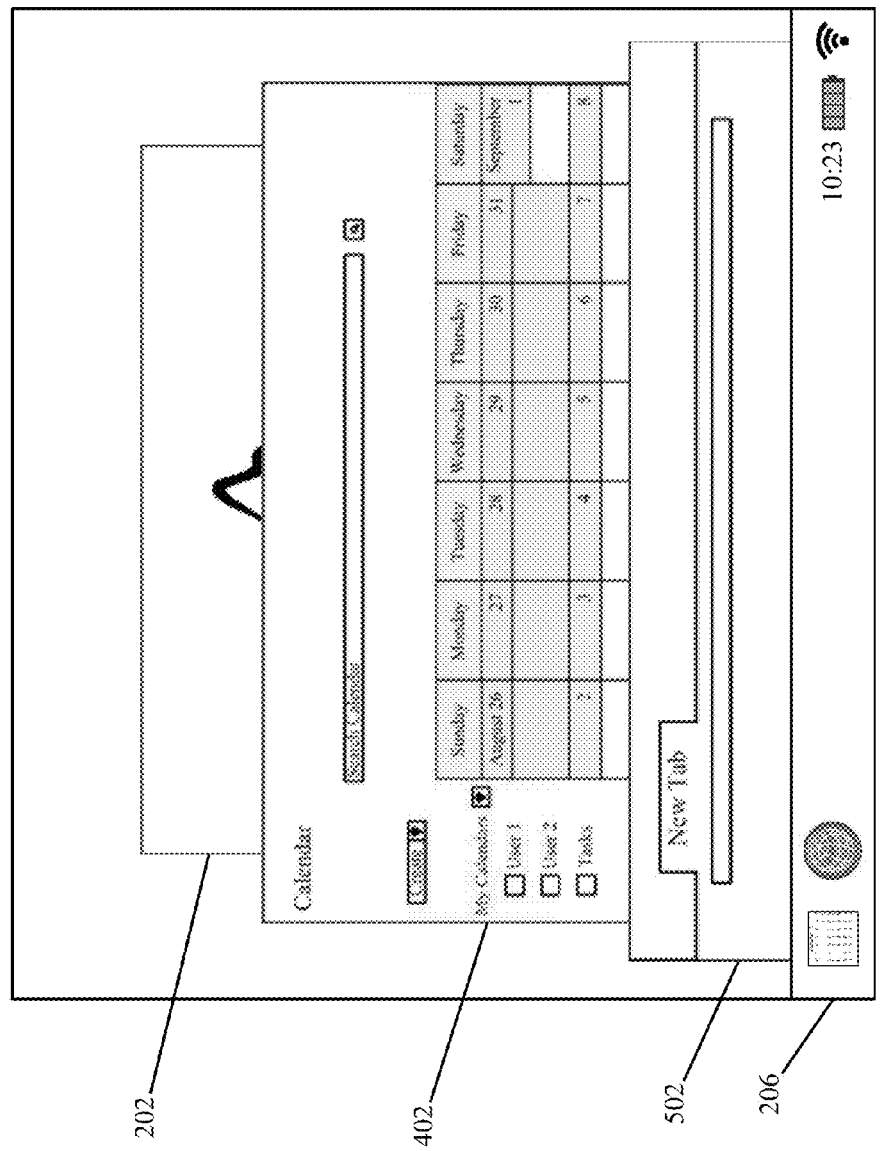
FIG. 8 illustrates an example of an overview of workspaces stacked on top of one another along a stacking axis, in accordance with various aspects of the subject technology.

According to a second approach, navigation module 104 may display the traversal of the stack from an overview perspective of the stack. For example, navigation module 104 may display an overview of the stack (e.g., as shown in FIG. 6). According to certain aspects, since the user is currently viewing desktop workspace 202, navigation module 104 may display the overview of the stack by displaying more of desktop workspace 202 than calendar workspace 402 (e.g., as shown in FIG. 7). Navigation module 104 may continue displaying the traversal of the stack by revealing more of calendar workspace 402 than desktop workspace 202 (e.g., as shown in FIG. 8.). For example, navigation module 104 may reveal more of calendar workspace 402 by shrinking desktop workspace 202 and/or covering desktop workspace 202 with calendar workspace 402. Navigation module 104 may also expand calendar workspace 402 to its maximized size in order to complete the traversal of the stack.

According to various aspects of the subject technology, the user may trigger navigation between different workspaces using a variety of techniques. For example, if the user is using a mouse, the user may navigate from desktop workspace 202 to calendar workspace 402 by moving the mouse away from the user or spinning the scroll wheel of the mouse forward from the user (e.g., thus providing the user with the appearance of physically sliding calendar workspace 402 onto desktop workspace 202). If the user is using a keyboard, the user may navigate from desktop workspace 202 to calendar workspace 402 by pressing the arrow key that is pointing up (e.g., thus providing the user with the appearance of physically sliding calendar workspace 402 onto desktop workspace 202). According to certain aspects, navigation module 104 may display navigation menu 206 when any of the stack of workspaces are displayed. Thus, the user may be allowed to click, tap, select, or perform some other suitable gesture on access point 208 to navigate to calendar workspace 402. In some aspects, the user may perform swipe gestures to navigate from desktop workspace 202 to calendar workspace 402. For example, referring to FIG. 7, the user may perform the swipe gesture along direction 702 (e.g., toward a top of desktop workspace 202) to navigate from desktop workspace 202 to calendar workspace 402, thereby allowing the user to view calendar workspace 402 as illustrated in FIG. 8. This swipe gesture may provide the user with the appearance of physically sliding calendar workspace 402 onto desktop workspace 202. According to certain aspects, this swipe gesture may be at least a two-finger swipe gesture. In one example, such a swipe gesture is a three-finger swipe gesture.

Although the subject technology has been described with respect to navigating from an earlier workspace that is generated (e.g., desktop workspace 202) to a later workspace that is generated (e.g., calendar workspace 402), navigation in the reverse direction is also possible. In such a case, opposite effects (e.g., expanding instead of shrinking, moving the mouse toward the user instead of away, spinning the scroll wheel backwards toward the user instead of forwards, pressing the arrow key that is pointing down instead of up, performing a swipe gesture toward the bottom of a workspace instead of the top, etc.) would be applicable.

Figure 9:
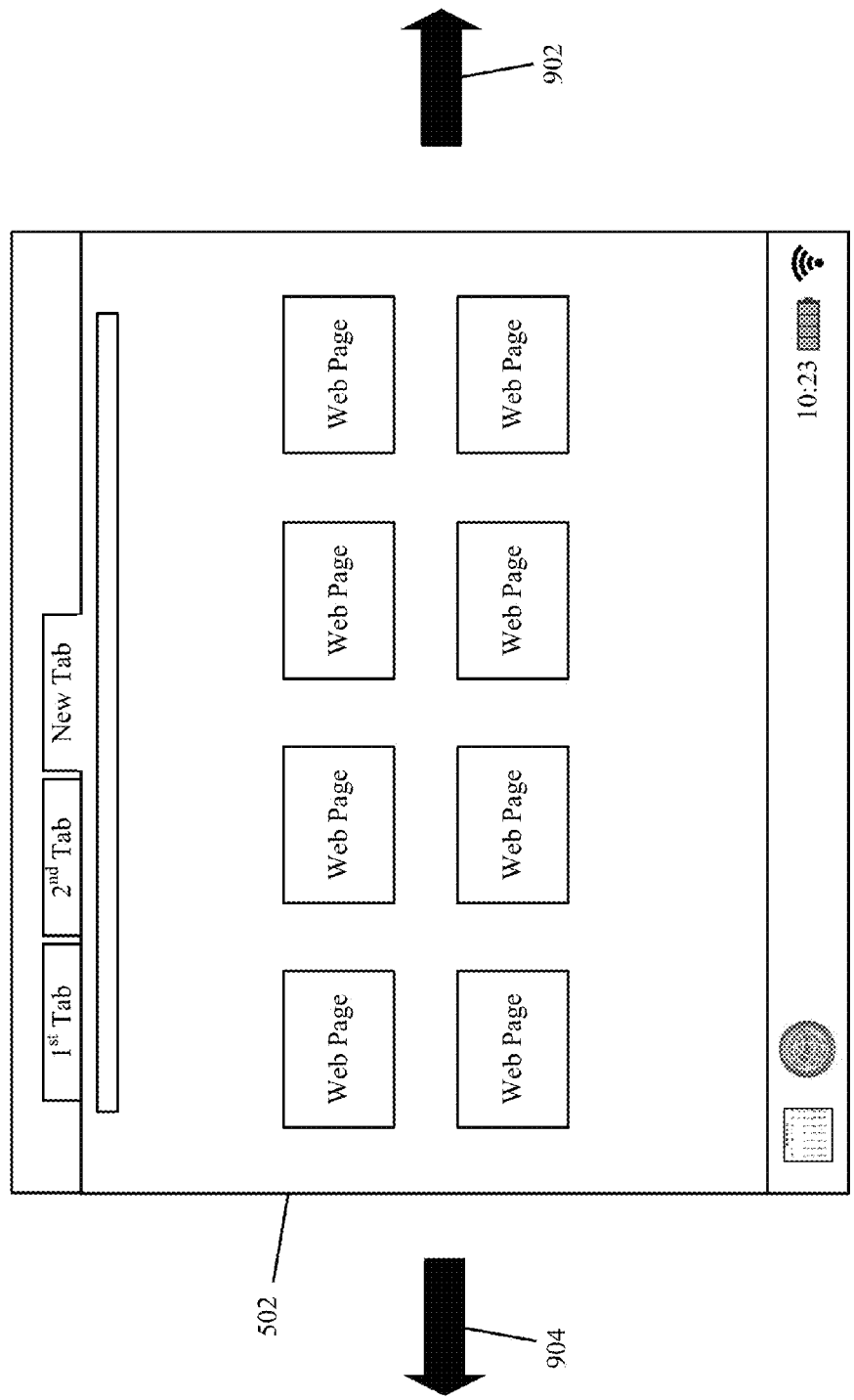
FIG. 9 illustrates an example of a workspace in which a web browser application is opened, in accordance with various aspects of the subject technology.

Furthermore, although inter-workspace swipe gestures have been described (e.g., swipe gestures that allow the user to navigate from one workspace to another), aspects of the subject technology also include intra-workspace swipe gestures (e.g., swipe gestures that allow the user to switch between features or applications opened in a particular workspace). For example, FIG. 9 illustrates web browser workspace 502 when the web browser application has multiple tabs opened (e.g., 1st Tab, 2nd Tab, and New Tab). A swipe gesture along direction 902 (e.g., toward one side of web browser workspace 502) may allow the user to switch from a current tab displayed (e.g., New Tab) to a next tab to be displayed (e.g., 1st Tab). A swipe gesture along direction 904 (e.g., toward the other side of web browser workspace 502) may allow the user to switch from the current tab displayed (e.g., New Tab) to the next tab to be displayed (e.g., 2nd Tab). These intra-workspace swipe gestures may also be at least two-finger swipe gestures (e.g., a three-finger swipe gesture). The intra-workspace swipe gestures may allow the user to switch between different features of an application, including windows, frames, tabs, buttons, access points, and/or other suitable objects of an application that the use can interact with.

Figure 10:
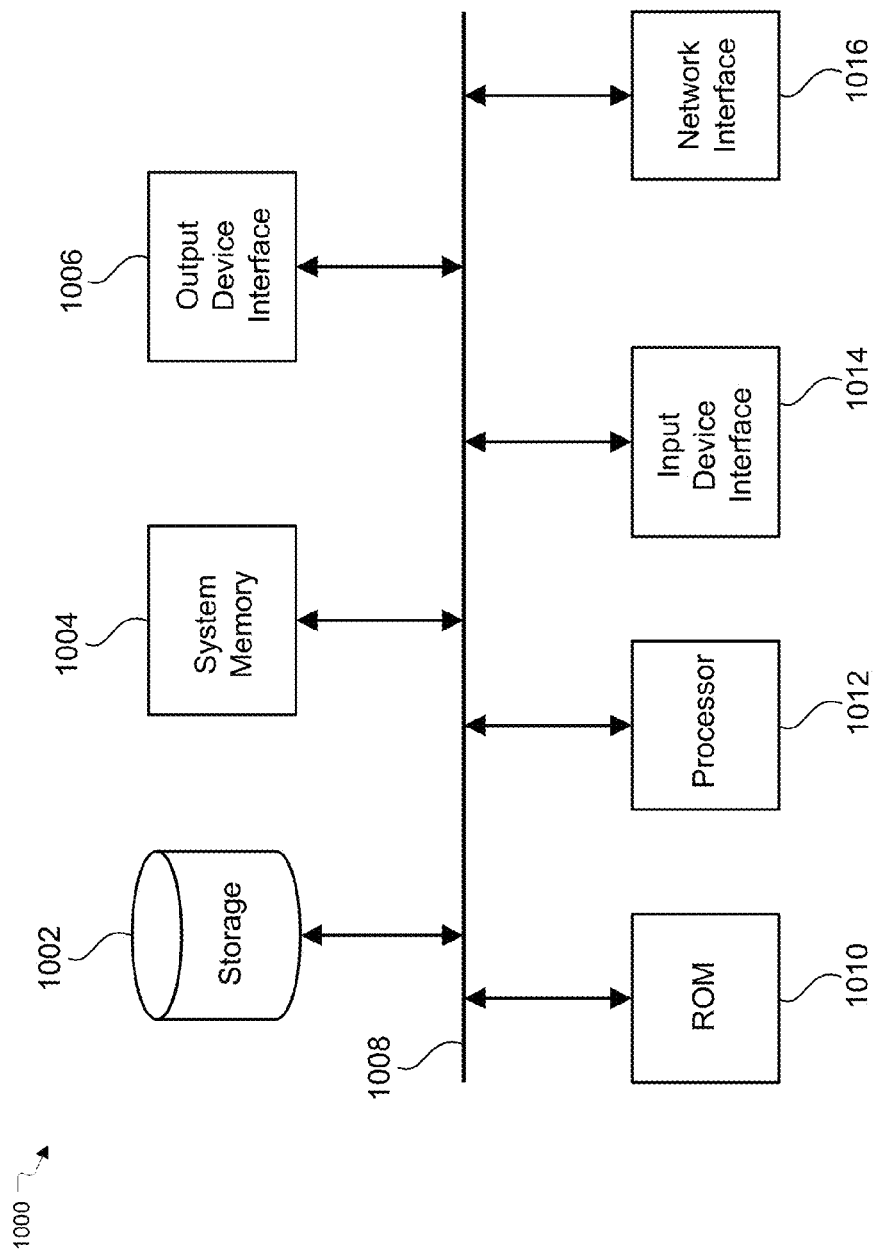
FIG. 10 conceptually illustrates an example of an electronic system, in accordance with various aspects of the subject technology.

FIG. 10 conceptually illustrates electronic system 1000 with which any implementations of the subject technology are implemented. Electronic system 1000, for example, can be a desktop computer, a laptop computer, a netbook computer, a tablet, a server, a phone, a personal digital assistant (PDA), any device that supports stackable workspaces, or generally any electronic device that transmits signals over a network. Such an electronic system includes various types of computer readable media and interfaces for various other types of computer readable media. Electronic system 1000 includes bus 1008, processing unit(s) 1012, system memory 1004, read-only memory (ROM) 1010, permanent storage device 1002, input device interface 1014, output device interface 1006, and network interface 1016, or subsets and variations thereof.

Bus 1008 collectively represents all system, peripheral, and chipset buses that communicatively connect the numerous internal devices of electronic system 1000. In one or more implementations, bus 1008 communicatively connects processing unit(s) 1012 with ROM 1010, system memory 1004, and permanent storage device 1002. From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. One or more implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as random access memory. System memory 1004 stores any of the instructions and data that processing unit(s) 1012 needs at runtime. In one or more implementations, the processes of the subject disclosure are stored in system memory 1004, permanent storage device 1002, and/or ROM 1010. From these various memory units, processing unit(s) 1012 retrieves instructions to execute and data to process in order to execute the processes of one or more implementations.

Bus 1008 also connects to input and output device interfaces 1014 and 1006. Input device interface 1014 enables a user to communicate information and select commands to the electronic system. Input devices used with input device interface 1014 include, for example, alphanumeric keyboards and pointing devices (also called "cursor control devices"). Output device interface 1006 enables, for example, the display of images generated by electronic system 1000. Output devices used with output device interface 1006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touch screen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, bus 1008 also couples electronic system 1000 to a network (not shown) through network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

The subject technology is illustrated, for example, according to various aspects described below. These are provided as examples, and do not limit the subject technology. It is noted that any of the examples below may be incorporated as part of another example.

According to certain aspects, a system for providing stackable workspaces on an electronic device is provided. The system comprises a navigation module configured to display a first workspace of a plurality of workspaces stacked along a stacking axis. The navigation module is configured to display a navigation menu when the first workspace is displayed. The navigation menu comprises a set of access points. Each access point is associated with an application. The system also comprises a workspace module configured to open at least one of the plurality of applications in a second workspace of the stack of workspaces. The second workspace is stacked on the first workspace. The system also comprises a detection module configured to detect a second workspace scrolling command. The navigation module is configured to display the second workspace in response to the second workspace scrolling command. Displaying the second workspace comprises traversing the stack from the first workspace to the second workspace along the stacking axis. The navigation module is configured to display the navigation menu when the second workspace is displayed.

In some aspects, the second workspace scrolling command comprises a maximize command associated with the at least one application opened in the second workspace. The second workspace scrolling command is associated with one of the set of access points associated with the at least one application opened in the second workspace. The second workspace scrolling command comprises a swipe gesture. In some aspects, the swipe gesture is substantially perpendicular to the stacking axis. In some aspects, the swipe gesture is toward a top of the first workspace. In some aspects, the swipe gesture is a three-fingered swipe gesture.

According to certain aspects, traversing the stack from the first workspace to the second workspace along the stacking axis comprises emulating movement of the stack such that the first workspace travels towards a vanishing point along the stacking axis and the second workspace travels onto a screen of the electronic device from a position beyond a screen of the electronic device. Traversing the stack from the first workspace to the second workspace along the stacking axis comprises shrinking the first workspace from a maximized size to an overview size. The maximized size of the first workspace is substantially equal to a size of a screen of the electronic device. The overview size of the first workspace is less than the maximized size of the first workspace. Traversing the stack from the first workspace to the second workspace along the stacking axis also comprises shrinking the second workspace from a supermaximized size to a maximized size. The maximized size of the second workspace is substantially equal to the size of the screen of the electronic device. The supermaximized size of the second workspace is greater than the maximized size of the second workspace.

According to certain aspects, traversing the stack from the first workspace to the second workspace along the stacking axis further comprises fading in the second workspace during at least one of the shrinking of the first workspace and the shrinking of the second workspace. Traversing the stack from the first workspace to the second workspace along the stacking axis comprises emulating movement of the stack such that the first workspace and the second workspace travel towards a vanishing point along the stacking axis.

In some aspects, traversing the stack from the first workspace to the second workspace along the stacking axis comprises displaying an overview of at least a portion of the stack and revealing more of the second workspace than the first workspace. Displaying the overview comprises displaying more of the first workspace than the second workspace. A size of each workspace displayed in the overview is less than a size of a screen of the electronic device. Revealing more of the second workspace than the first workspace comprises at least one of shrinking the first workspace and covering the first workspace with the second workspace. Traversing the stack from the first workspace to the second workspace along the stacking axis further comprises expanding the second workspace to a maximized size. The maximized size of the second workspace is substantially equal to a size of a screen of the electronic device.

According to certain aspects, the navigation module is configured to display the navigation menu during the traversing the stack from the first workspace to the second workspace along the stacking axis. The detection module is configured to detect a first workspace scrolling command. The first workspace scrolling command comprises a maximize command associated with the first workspace. In some aspects, the first workspace scrolling command is associated with one of the set of access points associated with at least one application opened in the first workspace. In some aspects, the first workspace scrolling command comprises a swipe gesture. The swipe gesture is substantially perpendicular to the stacking axis. The swipe gesture is toward a bottom of the second workspace. The swipe gesture is a three-fingered swipe gesture.

According to certain aspects, the navigation module is configured to traverse the stack from the second workspace to the first workspace along the stacking axis in response to the first workspace scrolling command. Traversing the stack from the second workspace to the first workspace along the stacking axis comprises emulating movement of the stack such that the second workspace travels to beyond a screen of the electronic device and the first workspace travels away from a vanishing point along the stacking axis. Traversing the stack from the second workspace to the first workspace along the stacking axis comprises expanding the second workspace from a maximized size to a supermaximized size. The maximized size of the second workspace is substantially equal to a size of a screen of the electronic device. The supermaximized size of the second workspace is greater than the maximized size of the second workspace. Traversing the stack from the second workspace to the first workspace along the stacking axis comprises expanding the first workspace from an overview size to a maximized size. The maximized size of the first workspace is substantially equal to the size of the screen of the electronic device. The overview size of the first workspace is less than the maximized size of the first workspace.

In some aspects, traversing the stack from the second workspace to the first workspace along the stacking axis further comprises fading in the first workspace during at least one of the expanding of the second workspace and the expanding of the first workspace. Traversing the stack from the second workspace to the first workspace along the stacking axis comprises emulating movement of the stack such that the second workspace and the first workspace travel away from a vanishing point along the stacking axis. In some aspects, traversing the stack from the second workspace to the first workspace along the stacking axis comprises displaying an overview of at least a portion of the stack and revealing more of the first workspace than the second workspace. The overview of the stack comprises displaying more of the second workspace than the first workspace. A size of each workspace displayed in the overview is less than a size of a screen of the electronic device. Revealing more of the first workspace than the second workspace comprises at least one of expanding the first workspace and hiding the second workspace. In some aspects, traversing the stack from the second workspace to the first workspace along the stacking axis further comprises expanding the first workspace to a maximized size. The maximized size of the first workspace is substantially equal to a size of a screen of the electronic device.

In some aspects, the navigation module is configured to display the navigation menu during the traversing the stack from the second workspace to the first workspace along the stacking axis. Each of the stack of workspaces comprises an area in which one or more applications are configured to be opened. In some aspects, the first workspace comprises a desktop workspace. The desktop workspace comprises a wallpaper.

According to various aspects of the subject technology, a computer-implemented method for providing stackable workspaces on an electronic device is provided. The method comprises displaying a first workspace of a plurality of workspaces stacked along a stacking axis and displaying a navigation menu when the first workspace is displayed. The navigation menu comprises a set of access points. Each access point is associated with an application The method also comprises opening at least one of the plurality of applications in a second workspace of the stack of workspaces. The second workspace is stacked on the first workspace. The method also comprises detecting a second workspace scrolling command and displaying the second workspace in response to the second workspace scrolling command. Displaying the second workspace comprises traversing the stack from the first workspace to the second workspace along the stacking axis. The method also comprises displaying the navigation menu when the second workspace is displayed.

According to various aspects of the subject technology, a machine-readable medium encoded with executable instructions for a method of providing stackable workspaces on an electronic device is provided. The method comprises displaying a first workspace of a plurality of workspaces stacked along a stacking axis and displaying a navigation menu when the first workspace is displayed. The navigation menu comprises a set of access points. Each access point is associated with an application. The method also comprises opening at least one of the plurality of applications in a second workspace of the stack of workspaces. The second workspace is stacked on the first workspace. The method also comprises detecting a second workspace scrolling command and displaying the second workspace in response to the second workspace scrolling command. Displaying the second workspace comprises traversing the stack from the first workspace to the second workspace along the stacking axis. The method also comprises displaying the navigation menu when the second workspace is displayed.

According to various aspects of the subject technology, a system for providing a user interface on an electronic device is provided. The system comprises a workspace module configured to generate a first workspace and a navigation module configured to generate a navigation menu comprising a set of access points. Each access point is associated with an application. The system also comprises a detection module configured to detect a swipe gesture performed on a first access point of the set of access points. The workspace module is configured to open the application associated with the first access point in a first window at an end of the swipe gesture in the first workspace. A size of the first window is less than a maximized size of the first workspace. The maximized size of the first workspace is substantially equal to a size of a screen of the electronic device.

In some aspects, the first workspace is part of a plurality of workspaces stacked along a stacking axis. The workspace module is configured to open at least one of the plurality of applications in a second workspace of the stack of workspaces. The second workspace is stacked on the first workspace. In some aspects, the detection module is configured to detect a second workspace scrolling command. The navigation module is configured to display the second workspace in response to the second workspace scrolling command. Displaying the second workspace comprises traversing the stack from the first workspace to the second workspace along the stacking axis.

According to certain aspects, the detection module is configured to detect a first workspace scrolling command. The navigation module is configured to traverse the stack from the second workspace to the first workspace along the stacking axis in response to the first workspace scrolling command. The navigation module is configured to display the navigation menu when the first workspace is displayed. The navigation module is configured to display the navigation menu when the second workspace is displayed. In some aspects, the navigation module is configured to display the navigation menu during the traversing the stack from the first workspace to the second workspace along the stacking axis. The navigation module is configured to display the navigation menu during the traversing the stack from the second workspace to the first workspace along the stacking axis. In some aspects, the first window is centered at the end of the swipe gesture.

According to various aspects of the subject technology, a computer-implemented method for providing a user interface on an electronic device is provided. The method comprises generating a first workspace and generating a navigation menu comprising a set of access points. Each access point is associated with an application. The method also comprises detecting a swipe gesture performed on a first access point of the set of access points and opening the application associated with the first access point in a first window at an end of the swipe gesture in the first workspace.

A size of the first window is less than a maximized size of the first workspace. The maximized size of the first workspace is substantially equal to a size of a screen of the electronic device.

According to various aspects of the subject technology, a machine-readable medium encoded with executable instructions for a method of providing a user interface on an electronic device is provided. The method comprises generating a first workspace and generating a navigation menu comprising a set of access points. Each access point is associated with an application. The method also comprises detecting a swipe gesture performed on a first access point of the set of access points and opening the application associated with the first access point in a first window at an end of the swipe gesture in the first workspace. A size of the first window is less than a maximized size of the first workspace. The maximized size of the first workspace is substantially equal to a size of a screen of the electronic device.

According to various aspects of the subject technology, a system for navigating stackable workspaces on an electronic device is provided. The system comprises a navigation module configured to display a first workspace of a plurality of workspaces stacked along a stacking axis. The plurality of workspaces comprises a second workspace stacked on the first workspace. At least one application is open in the first workspace or in the second workspace. The system also comprises a detection module configured to detect at least one of a first inter-workspace swipe gesture and an intra-workspace swipe gesture. The navigation module is configured to display the second workspace in response to the first inter-workspace swipe gesture. The navigation module is configured to switch between features or applications of the at least one application in response to the intra-workspace swipe gesture.

In some aspects, the first inter-workspace swipe gesture and the intra-workspace swipe gesture are perpendicular to one another. In some aspects, the first inter-workspace swipe gesture is toward a top of the first workspace and the intra-workspace swipe gesture is toward a side of the first workspace. In some aspects, the first inter-workspace swipe gesture and/or the intra-workspace swipe gesture is a three-fingered swipe gesture.

In some aspects, the detection module is configured to detect at a second inter-workspace swipe gesture. The navigation module is configured to display the first workspace in response to the second inter-workspace swipe gesture. In some aspects, the second inter-workspace swipe gesture is toward a bottom of the second workspace and the second inter-workspace swipe gesture is a three-fingered swipe gesture. In some aspects, the features of the at least one application comprise at least one of windows, frames, tabs, buttons, and access points.

According to various aspects of the subject technology, a computer-implemented method for navigating stackable workspaces on an electronic device is provided. The method comprises displaying a first workspace of a plurality of workspaces stacked along a stacking axis. The plurality of workspaces comprises a second workspace stacked on the first workspace. At least one application is open in the first workspace or in the second workspace. The method also comprises detecting at least one of a first inter-workspace swipe gesture and an intra-workspace swipe gesture. The method also comprises displaying the second workspace in response to the first inter-workspace swipe gesture and switching between features or applications of the at least one application in response to the intra-workspace swipe gesture.

According to various aspects of the subject technology, a machine-readable medium encoded with executable instructions for a method of navigating stackable workspaces on an electronic device is provided. The method comprises displaying a first workspace of a plurality of workspaces stacked along a stacking axis. The plurality of workspaces comprises a second workspace stacked on the first workspace. At least one application is open in the first workspace or in the second workspace. The method also comprises detecting at least one of a first inter-workspace swipe gesture and an intra-workspace swipe gesture. The method also comprises displaying the second workspace in response to the first inter-workspace swipe gesture and switching between features or applications of the at least one application in response to the intra-workspace swipe gesture.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Terms such as "top," "bottom," "front," "rear" and the like as used in this disclosure, if any, should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:
1. A system for navigating stackable workspaces on an electronic device, the system comprising:
  one or more processors; and
  a non-transitory computer-readable medium comprising instructions stored therein, which when executed by the one or more processors, cause the one or more processors to perform operations comprising:
    displaying a first workspace in a maximized size, a first application having been opened in the first workspace;
    displaying a set of access points, wherein each access point of the set of access points is associated with a respective application;
    detecting a first gesture performed on a first access point of the set of access points;
    opening a second application associated with the first access point in the first workspace in response to the first gesture, wherein the first access point continues to be displayed after the second application is opened, and wherein the second application is different from the first application;
    detecting a first inter-workspace swipe gesture or an intra-workspace swipe gesture, wherein the first inter-workspace swipe gesture comprises a swipe gesture along a single direction;
    displaying the first workspace and a second workspace stacked along a stacking axis when the first inter-workspace swipe gesture is detected, wherein the displaying the first workspace and the second workspace stacked along the stacking axis comprises:
        shrinking the first workspace from the maximized size to a first overview size; and
        displaying an overview of the first workspace and the second workspace stacked along the stacking axis, wherein the second workspace is in a second overview size that is smaller than the maximized size; and
    switching between the first application and the second application opened in the first workspace when the intra-workspace swipe gesture is detected, wherein the first inter-workspace swipe gesture and the intra-workspace swipe gesture are perpendicular to one another;
    detecting a second gesture performed on the first access point;
    opening a third workspace when the second gesture is detected; and
    opening the second application in the third workspace.

2. The system of claim 1, wherein the first inter-workspace swipe gesture is toward a top of the first workspace.

3. The system of claim 1, wherein the intra-workspace swipe gesture is toward a side of the first workspace.

4. The system of claim 1, wherein each of the first inter-workspace swipe gesture and the intra-workspace swipe gesture is a three-fingered swipe gesture.

5. The system of claim 1, wherein the operations further comprise:
    detecting a second inter-workspace swipe gesture; and
    displaying the first workspace in response to the second inter-workspace swipe gesture.

6. The system of claim 5, wherein the second inter-workspace swipe gesture is toward a bottom of the second workspace.

7. The system of claim 1, wherein the operations further comprise, when the first inter-workspace swipe gesture is detected, emulating movement of at least the second workspace such that the second workspace covers the first workspace.

8. The system of claim 1, wherein displaying the overview of the first workspace and the second workspace comprises displaying the first workspace in the first overview size and the second workspace in the second overview size such that the first workspace covers a portion of the second workspace.

9. The system of claim 1, wherein opening the second application in the third workspace comprises opening the second application in the maximized size in the third workspace.

10. A computer-implemented method for navigating stackable workspaces on an electronic device, the method comprising:
    displaying a set of access points, wherein each access point of the set of access points is associated with a respective application;
    detecting a first gesture performed on a first access point of the set of access points;
    opening a first application associated with the first access point in response to the first gesture, wherein the first access point continues to be displayed after the first application is opened;
    detecting a first inter-workspace swipe gesture or an intra-workspace swipe gesture;
    displaying a plurality of workspaces stacked along a stacking axis when the first inter-workspace swipe gesture is detected, the plurality of workspaces comprising a first workspace and a second workspace stacked on the first workspace, wherein the first application and a second application are open in the first workspace, wherein the displaying the plurality of workspaces comprises:
        shrinking the first workspace from a maximized size to a first overview size; and
        displaying an overview of the plurality of workspaces stacked along the stacking axis, wherein the second workspace is in a second overview size that is smaller than the maximized size; and
    switching between the first application and the second application opened in the first workspace when the intra-workspace swipe gesture is detected, wherein the first application is different from the second application, wherein the first inter-workspace swipe gesture and the intra-workspace swipe gesture are perpendicular to one another;
    detecting a second gesture performed on the first access point;
    opening a third workspace when the second gesture is detected; and
    opening the first application in the third workspace.

11. The method of claim 10, further comprising, when the first inter-workspace swipe gesture is detected, traversing from the first workspace to the second workspace along the stacking axis.

12. The method of claim 11, wherein traversing from the first workspace to the second workspace along the stacking axis comprises emulating movement such that the first workspace travels towards a vanishing point along the stacking axis and the second workspace travels onto a screen of the electronic device from a position beyond the screen of the electronic device.

13. The method of claim 10, wherein the first gesture comprises a swipe gesture and the second gesture comprises a tap gesture.

14. The method of claim 10, wherein the first access point continues to be displayed when the plurality of workspaces is displayed.

15. A system for providing a user interface on an electronic device, the system comprising:
one or more processors; and
a non-transitory computer-readable medium comprising instructions stored therein, which when executed by the one or more processors, cause the one or more processors to perform operations comprising:
providing for display a first workspace, a first application having been opened in the first workspace;
generating a navigation menu comprising a set of access points, each access point of the set of access points being associated with a respective application;
detecting a swipe gesture performed on a first access point of the set of access points;
opening a second application associated with the first access point in a first window at an end of the swipe gesture in the first workspace, wherein the second application is different from the first application;
detecting an inter-workspace swipe gesture or an intra-workspace swipe gesture;
providing for simultaneous display the first workspace and a second workspace on a screen of the electronic device when the inter-workspace swipe gesture is detected, wherein the providing comprises:
shrinking the first workspace from a maximized size to a first overview size; and
displaying an overview of the first workspace and the second workspace stacked along a stacking axis, wherein the second workspace is in a second overview size that is smaller than the maximized size; and
switching between the first application and the second application when the intra-workspace swipe gesture is detected,
wherein:
a size of the first window is less than the maximized size of the first workspace,
the maximized size of the first workspace is substantially equal to a size of the screen of the electronic device,
the first access point continues to be displayed after the second application is opened,
the first access point continues to be displayed when the first workspace and the second workspace are simultaneously displayed,
the first window is displayed when the second application is opened, and
the inter-workspace swipe gesture and the intra-workspace swipe gesture are perpendicular to one another.

16. The system of claim 15, wherein the first workspace is part of a plurality of workspaces stacked along a stacking axis, the operations further comprising opening at least one of a plurality of applications in the second workspace of the plurality of workspaces, wherein the second workspace is stacked on the first workspace.

17. The system of claim 16, wherein the operations further comprise detecting a workspace scrolling command.

18. The system of claim 17, wherein the operations further comprise displaying the second workspace in response to the workspace scrolling command.

19. The system of claim 18, wherein displaying the second workspace comprises traversing from the first workspace to the second workspace along the stacking axis.

20. The system of claim 18, wherein the operations further comprise displaying the navigation menu when the first workspace is displayed and when the second workspace is displayed.

21. The system of claim 19, wherein the operations further comprise displaying the navigation menu during the traversing from the first workspace to the second workspace along the stacking axis.

22. The system of claim 15, wherein the first window is centered at the end of the swipe gesture.

* * * * *